(12) United States Patent
Wang et al.

(10) Patent No.: US 12,693,696 B2
(45) Date of Patent: Jul. 28, 2026

(54) VOLTAGE REGULATOR WITH CHARGE PUMP HAVING ENABLE CONTROL

(71) Applicant: ESPRESSIF SYSTEMS (SHANGHAI) CO., LTD., Shanghai (CN)

(72) Inventors: Qiang Wang, Shanghai (CN); Zibai Liu, Shanghai (CN)

(73) Assignee: ESPRESSIF SYSTEMS (SHANGHAI) CO., LTD., Shanghai (CN)

( * ) Notice: Subject to any disclaimer, the term of this patent is extended or adjusted under 35 U.S.C. 154(b) by 179 days.

(21) Appl. No.: 18/721,014

(22) PCT Filed: Dec. 13, 2022

(86) PCT No.: PCT/CN2022/138736
§ 371 (c)(1),
(2) Date: Jun. 17, 2024

(87) PCT Pub. No.: WO2023/109824
PCT Pub. Date: Jun. 22, 2023

(65) Prior Publication Data
US 2025/0060768 A1      Feb. 20, 2025

(30) Foreign Application Priority Data

Dec. 16, 2021      (CN) .......................... 202111561790.7

(51) Int. Cl.
*G05F 1/575* (2006.01)
*H02M 3/07* (2006.01)
(52) U.S. Cl.
CPC .............. *G05F 1/575* (2013.01); *H02M 3/07* (2013.01)

(58) Field of Classification Search
CPC .......................... H02M 3/07–073; G05F 1/575
See application file for complete search history.

(56) References Cited

U.S. PATENT DOCUMENTS 5,770,940 A      6/1998 Goder
6,188,212 B1      2/2001 Larson
(Continued)

FOREIGN PATENT DOCUMENTS

CN      101109775 A      1/2008
CN      101467341 A      6/2009
(Continued)

OTHER PUBLICATIONS

First Office Action from Priority Chinese Application No. 202111561790.7 with English Translation Dec. 2, 2022.
(Continued)

*Primary Examiner* — Sisay G Tiku
(74) *Attorney, Agent, or Firm* — Aird & McBurney LP

(57) ABSTRACT

Disclosed is a voltage regulator including a power supply terminal and an output terminal. The voltage regulator includes an NMOS transistor including a drain electrode connected to the power supply terminal, a gate electrode, and a source electrode connected to the output terminal; a first regulating circuit including a voltage divider circuit connected between the output terminal and ground, and configured to generate a feedback voltage based on the output voltage of the output terminal, and an error amplifier including a first input terminal, a second input terminal, and an output terminal connected to the gate electrode; and a second regulating circuit including a charge pump having an enable control terminal and an output terminal connected to the gate electrode, wherein the charge pump is configured to be selectively turned on based on the enable control signal to regulate the output voltage of the voltage regulator.

11 Claims, 5 Drawing Sheets

(56)                 References Cited

U.S. PATENT DOCUMENTS

| | | | | |
|---|---|---|---|---|
| 6,617,832 | B1 * | 9/2003 | Kobayashi | H02M 3/07 |
| | | | | 323/280 |
| 8,248,150 | B2 * | 8/2012 | Tadeparthy | G05F 1/56 |
| | | | | 363/60 |
| 8,598,854 | B2 * | 12/2013 | Soenen | G05F 1/575 |
| | | | | 363/59 |
| 9,223,329 | B2 * | 12/2015 | Pulvirenti | G05F 1/56 |
| 9,312,824 | B2 * | 4/2016 | Kuttner | H03F 3/45071 |
| 9,778,672 | B1 | 10/2017 | Gao | |
| 10,530,249 | B1 * | 1/2020 | Lee | H02M 1/08 |
| 11,146,173 | B1 | 10/2021 | Zamarreno Ramos | |
| 12,276,993 | B2 * | 4/2025 | Pande | G05F 1/575 |
| 2011/0285372 | A1 | 11/2011 | Takahashi | |
| 2017/0063223 | A1 | 3/2017 | Raghupathy | |
| 2025/0123646 | A1 * | 4/2025 | Wei | G05F 1/595 |

FOREIGN PATENT DOCUMENTS

| | | |
|---|---|---|
| CN | 101615046 A | 12/2009 |
| CN | 203070144 U | 7/2013 |
| CN | 203733021 U | 7/2014 |
| CN | 205910520 U | 1/2017 |
| CN | 108508958 A | 9/2018 |
| CN | 108646841 A | 10/2018 |
| CN | 109416553 A | 3/2019 |
| CN | 111290470 A | 6/2020 |
| CN | 212381445 U | 1/2021 |
| CN | 112947662 A | 6/2021 |
| CN | 114253333 A | 3/2022 |
| CN | 114825912 A | 7/2022 |

OTHER PUBLICATIONS

Second Office Action from Priority Chinese Application No. 202111561790.7 with Machine Translation Apr. 27, 2023.
International Search Report and Written Opinion from Corresponding PCT Application No. PCT/CN2022/138736 with English Translation Jan. 30, 2023.

* cited by examiner

VOLTAGE REGULATOR WITH CHARGE PUMP HAVING ENABLE CONTROL

CROSS-REFERENCE TO RELATED APPLICATIONS

This application is the U.S. National Phase Application under 35 U.S.C. § 371 of International Patent Application No. PCT/CN2022/138736 filed on Dec. 13, 2022, which claims priority to Chinese Patent Application CN202111561790.7 filed on Dec. 16, 2021. The disclosures of the aforementioned applications are hereby incorporated by reference in their entireties.

TECHNICAL FIELD

The present application relates to circuit technology and in particular to a voltage regulator.

BACKGROUND

A low dropout or low dropout regulator (LDO Regulator) is a linear regulator used to provide a constant output voltage. LDO regulators are widely used in various circuits due to their low static power consumption, small footprint and ability to maintain low output impedance and noise.

However, as a load of the LDO regulator increases, its output voltage decreases and then gradually recovered under the action of its analog feedback loop. When the load of the LDO regulator suddenly increases and causes the output voltage to drop rapidly, the analog feedback loop, due to its slow feedback regulation after a response, may prevent the dropped output voltage from being recovered promptly, thus hindering the normal operation of the load circuit or degrading its operation performance. Therefore, it is necessary to address how to solve the above problems of LDO regulators.

SUMMARY

Embodiments of the present application provide a voltage regulator for solving a problem of rapid restoration after a drop in the output voltage.

According to a first aspect of the present application, a voltage regulator is provided. The voltage regulator includes a power supply terminal and an output terminal, the voltage regulator being configured to provide a power supply voltage at the power supply terminal, and the output terminal being configured to connect to a load and to provide an output voltage, wherein the voltage regulator includes: an NMOS transistor including a drain electrode connected to the power supply terminal of the voltage regulator, a gate electrode, and a source electrode connected to the output terminal of the voltage regulator; a first regulating circuit including: a voltage divider circuit connected between the output terminal of the voltage regulator and ground, the voltage divider circuit being configured to generate a feedback voltage based on the output voltage of the output terminal of the voltage regulator; an error amplifier including a first input terminal configured to provide a reference voltage, a second input terminal connected to the voltage divider circuit, and an output terminal connected to the gate electrode of the NMOS transistor; and a second regulating circuit including: a charge pump including an enable control terminal configured to receive an enable control signal and an output terminal connected to the gate electrode, the charge pump being configured to be selectively turned on based on the enable control signal to regulate the output voltage of the voltage regulator.

In combination with the first aspect, in a first possible embodiment, the charge pump further includes a clock input terminal, wherein the charge pump is configured to receive a clock signal through the clock input terminal and to increase the voltage at the gate electrode of the NMOS transistor based on the clock signal upon being turned on, to increase the output voltage of the voltage regulator.

In combination with the first possible embodiment of the first aspect, in a second possible embodiment, the charge pump further includes: a first switch group including a plurality of switches; a second switch group including a plurality of switches; a first capacitor, together with the first switch group, being coupled between the power supply terminal of the voltage regulator and the ground, as well as being coupled between the output terminal of the charge pump and the ground; a second capacitor, together with the second switch group, being coupled between the power supply terminal of the voltage regulator and the ground, as well as being coupled between the output terminal of the charge pump and the ground; wherein in response to that the charge pump is turned on and the clock signal is a first level signal, one or more switches in the first and second switch groups are selectively controlled to charge the first capacitor and discharge the second capacitor; and in response to that the charge pump is turned on and the clock signal is a second level signal, one or more switches in the first and second switch groups are selectively controlled to discharge the first capacitor and charge the second capacitor; and wherein the charge pump is turned on in response to the enable control signal being a third level signal; and the charge pump is turned off in response to the enable control signal being a fourth level signal.

In combination with the second possible embodiment of the first aspect, in a third possible embodiment, the first switch group includes a first switch, a second switch, a third switch and a fourth switch, wherein a first end of the first switch is connected to the power supply terminal of the voltage regulator, a second end of the first switch is connected to a positive pole of the first capacitor, a negative pole of the first capacitor is connected to a first end of the second switch, a second end of the second switch is connected to the ground, a first end of the third switch is connected to the power supply terminal of the voltage regulator, a second end of the third switch is connected to the negative pole of the first capacitor, a first end of the fourth switch is connected to the positive pole of the first capacitor, and a second end of the fourth switch is connected to the output terminal of the charge pump; and the second switch group includes a fifth switch, a sixth switch, a seventh switch and a eighth switch, wherein a first end of the fifth switch is connected to the power supply terminal of the voltage regulator, a second end of the fifth switch is connected to a positive pole of the second capacitor, a negative pole of the second capacitor is connected to a first end of the sixth switch, a second end of the sixth switch is connected to the ground, a first end of the seventh switch is connected to the power supply terminal of the voltage regulator, a second end of the seventh switch is connected to the negative pole of the second capacitor, a first end of the eighth switch is connected to the positive pole of the second capacitor, and a second end of the eighth switch is connected to the output terminal of the charge pump; wherein in response to that the enable control signal is a third level signal and the clock signal is a first level signal, the first switch, the second switch, the seventh switch and the eighth switch are switched on, and the third switch, the fourth switch, the fifth switch and the sixth switch are switched off; in response to that the enable control signal is a third level signal and the clock signal is a second level signal, the first switch, the second switch, the seventh switch and the eighth switch are switched off, and the third switch, the fourth switch, the fifth switch and the sixth switch are switched on; and in response to that the enable control signal is a fourth level signal, all switches in the first and second switch groups are switched off.

In combination with the third possible embodiment of the first aspect, in the fourth possible embodiment, the charge pump further includes a gate control circuit including the enable control terminal, the clock input terminal, a first output control terminal, and a second output control terminal; wherein the first output control terminal is connected to a control terminal of the first switch, the second switch, the seventh switch and the eighth switch, and the second output control terminal is connected to a control terminal of the third switch, the fourth switch, the fifth switch and the sixth switch.

In combination with the fourth possible embodiment of the first aspect, in the fifth possible embodiment, the gate control circuit further includes: a NOT gate, a first NAND gate, a second NAND gate, a third AND gate and a fourth AND gate; wherein a first input terminal of the first NAND gate is connected to the clock input terminal, a second input terminal of the first NAND gate is connected to an output terminal of the second NAND gate, an output terminal of the first NAND gate is connected to a first input terminal of the second NAND gate and a first input terminal of the third AND gate; an input terminal of the NOT gate is connected to the clock input terminal, and an output terminal of the NOT gate is connected to a second input terminal of the second NAND gate, and an output terminal of the second NAND gate is connected to a first input terminal of the fourth AND gate; a second input terminal of the third AND gate and a second input terminal of the fourth AND gate are connected to the enable control terminal, an output terminal of the third AND gate is a first output terminal of the gate control circuit, and an output terminal of the fourth AND gate is a second output terminal of the gate control circuit.

In combination with the first possible embodiment of the first aspect, in the sixth possible embodiment, the second regulating circuit further includes a clock circuit, the clock circuit is configured to output the clock signal.

In combination with the first aspect or any of the first to the sixth possible embodiments of the first aspect, in the seventh possible embodiment, the second regulating circuit further includes:

a hysteresis comparator including a first input terminal, a second input terminal and an output terminal, wherein a first threshold voltage and a second threshold voltage are provided at the first input terminal of the hysteresis comparator, the first threshold voltage is less than the second threshold voltage, the second input terminal of the hysteresis comparator is connected to the output terminal of the voltage regulator, and the output terminal of the hysteresis comparator is connected to the enable control terminal of the charge pump; wherein the hysteresis comparator is configured to generate the output signal based on the output voltage of the voltage regulator, the first threshold in voltage and the second threshold voltage, and the output signal serves as the enable control signal of the charge pump.

In combination with the seventh possible embodiment of the first aspect, in the eighth possible embodiment, the hysteresis comparator is further configured to output a third level signal in response to the output voltage of the voltage regulator being not greater than the first threshold voltage, and to output a fourth level signal in response to the output voltage of the voltage regulator being not less than the second threshold voltage.

In combination with the eighth possible embodiment of the first aspect, in the ninth possible embodiment, the charge pump is configured to be turned on in response to the enable control signal being the third level signal, to increase the voltage at the gate electrode, thereby increasing and recovering the output voltage of the voltage regulator after the output voltage of the voltage regulator drops.

In combination with the first aspect or any of the first to the sixth possible embodiments of the first aspect, in the tenth possible embodiment, the second regulating circuit further includes a controller configured to obtain information indicating that the output voltage of the voltage regulator will drop at a first time and to provide a third level signal to the enable control terminal at a second time prior to the first time is reached; wherein the charge pump is further configured to be turned on in response to receiving the third level signal, to increase the voltage at the gate electrode, thereby increasing the output voltage of the voltage regulator before the output voltage of the voltage regulator drops.

In combination with the tenth possible embodiment of the first aspect, in the eleventh possible embodiment, the controller is further configured to provide the clock signal to the clock input terminal of the charge pump.

In combination with the eleventh possible embodiment of the first aspect, in the twelfth possible embodiment, the information indicating that the output voltage of the voltage regulator will drop at the first time is based on the information indicating that the load of the voltage regulator will change at the first time.

In combination with the twelfth possible embodiment of the first aspect, in the thirteenth possible embodiment, the controller is further configured to start to drive the load at the first time.

In combination with the tenth possible embodiment of the first aspect, in the fourteenth possible embodiment, the controller is further configured to adjust one or more of the following parameters of the charge pump: capacitance, clock frequency, and turn-on time.

Embodiments of the present application provide a voltage regulator that can ensure the normal operation of a load by controlling a second regulating circuit including a charge pump to rapidly increase the output voltage after a drop in the output voltage.

BRIEF DESCRIPTION OF DRAWINGS

In order to provide a clearer explanation of the technical solutions in the embodiments of the present application or existing art, the accompanying drawings in the description of the embodiments or existing art will be briefly outlined below. It should be understood that the accompanying drawings in the following description only show some of the embodiments of the present application, and other accompanying drawings can be derived from these drawings by the person of ordinary skill in the art without any creative efforts.

DESCRIPTION OF EMBODIMENTS

The technical solutions in the embodiments of the present application will be described clearly and thoroughly in the following in conjunction with the accompanying drawings in the embodiments of the present application, and it is clear that the described embodiments are only some but not all of the embodiments of the present application. Based on the embodiments in this application, all other embodiments obtained by the person of ordinary skill in the art without any creative efforts shall fall within the protection scope of this application.

Figure 1:
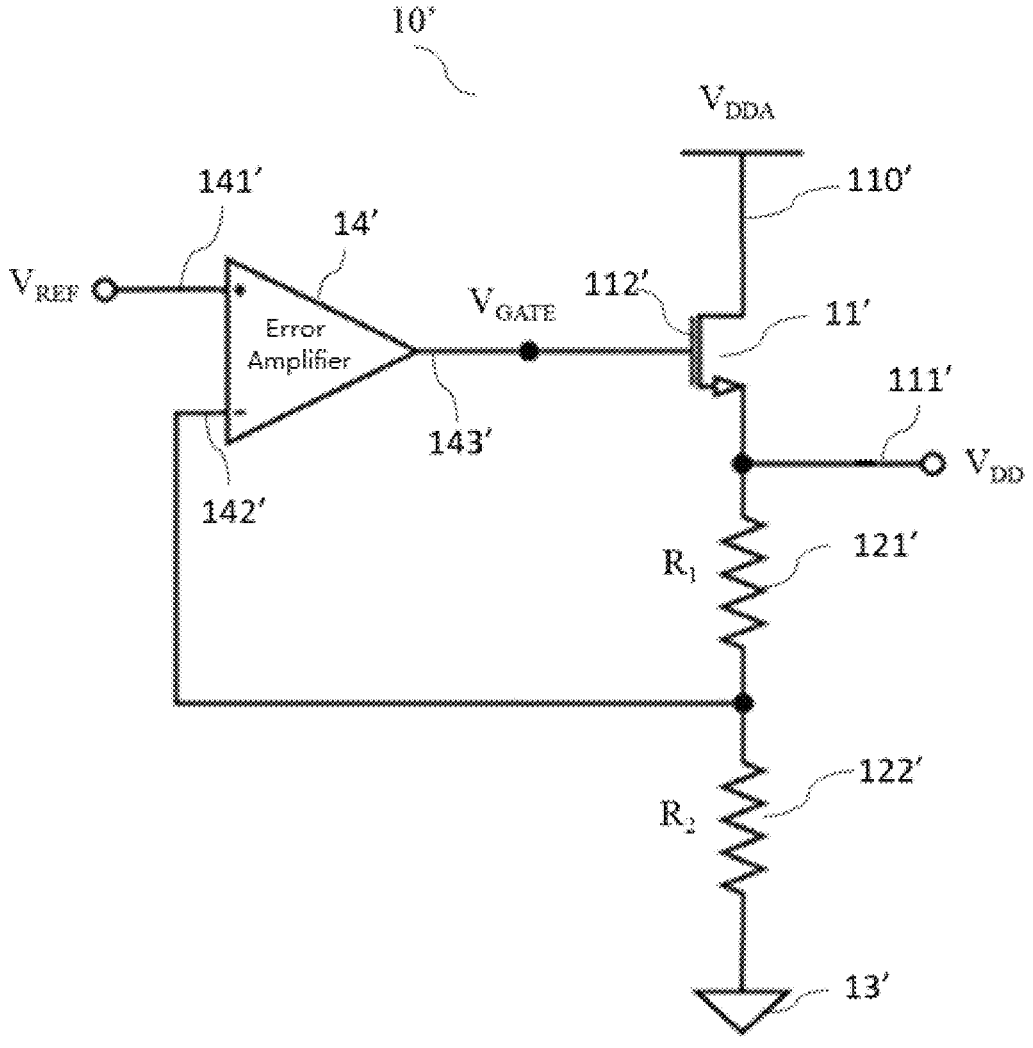
FIG. 1 is a schematic diagram of a circuit structure of an existing LDO regulator.

FIG. 1 is a schematic diagram of a circuit structure of an existing LDO regulator 10'. The LDO regulator 10' includes an error amplifier 14', an NMOS transistor 11' and a voltage divider circuit (not shown). The NMOS transistor 11' is coupled between a power supply terminal 110' and an output terminal 111' of the LDO regulator 10', and the power supply terminal 110' of the LDO regulator 10' is provided with a power supply voltage $V_{DDA}$, and the output terminal 111' thereof is configured to output an output voltage $V_{DD}$. Here, a load and a load circuit (not shown in this figure) is connected between the output terminal 111' of the LDO regulator 10' and ground 13'. The voltage divider circuit and the error amplifier 14' are coupled between the output terminal 111' of the LDO regulator 10' and the gate electrode 112' of the NMOS transistor 11' to form an analog feedback loop, for outputting a stable output voltage $V_{DD}$ through the feedback regulation. Here, the voltage divider circuit includes resistors 121' and 122', the resistors 121' and 122' are connected in series between the output terminal 111' and the ground 13'. A reference voltage $V_{REF}$ is provided at a first input terminal 141' of the error amplifier 14'. A second input terminal 142' of the error amplifier 14' is connected between the resistor 121' and the resistor 122'. And an output 143' of the error amplifier 14' is connected to a gate electrode 112' of the NMOS transistor 11'. The output voltage $V_{DD}$ of the LDO regulator 10' can be calculated based on the following equation (1):

$$V_{DD} = V_{REF} * \left(1 + \frac{R_1}{R_2}\right) \tag{1}$$

wherein $R_1$ denotes a resistance value of the resistor 121', $R_2$ denotes a resistance value of the resistor 122'.

Figure 2:
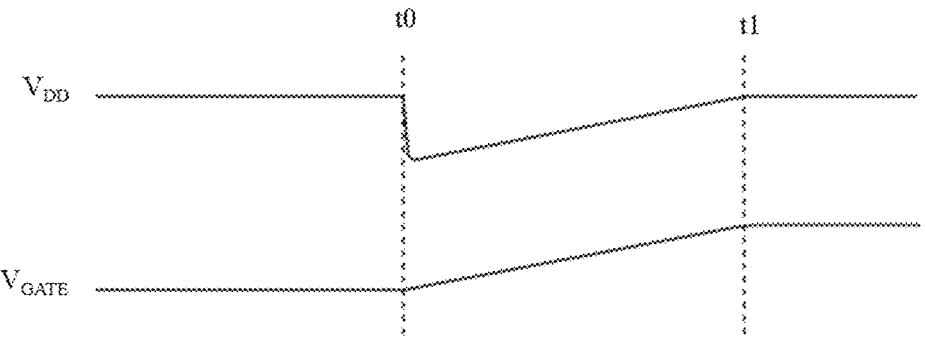
FIG. 2 is a schematic diagram illustrating timing relationship between an output voltage of the LDO regulator and a gate voltage in FIG. 1.

When the LDO regulator 10' is connected to a load or a load circuit, or when the load increases, the output voltage of the LDO regulator 10' decreases and then gradually restores under the action of its analog feedback loop. However, as shown in FIG. 2, in the case that the load of the LDO regulator 10' increases suddenly at time to, resulting in a rapid drop in the output voltage $V_{DD}$, as a response, the feedback regulation of the analog feedback loop is slow due to the limitation of the bandwidth of the analog feedback loop, and the $V_{GATE}$ can only raise slowly until time t1 at which the output voltage $V_{DD}$ recovers to its normal level. Since the output voltage remains low between to and t1 for an excessively long period of time (e.g., the time period between to and t1 is not less than 10 µs), this may results in the failure of the load circuit to operate properly or affect the operation performance of the load circuit.

In view of the above problem, one existing solution is to utilize an off-chip decoupling capacitor with a large capacitance value (e.g., 0.1 µF to 10 µF) to decrease the reduction magnitude of the output voltage $V_{DD}$. However, this approach can significantly increase the cost of use. Another solution is to increase the bandwidth of the analog feedback loop to decrease the restoration time of the output voltage $V_{DD}$. However, this can significantly increase the static power consumption.

In this regard, in order to at least solve the above problems, embodiments of the present application provide a voltage regulator as described below.

Figure 3:
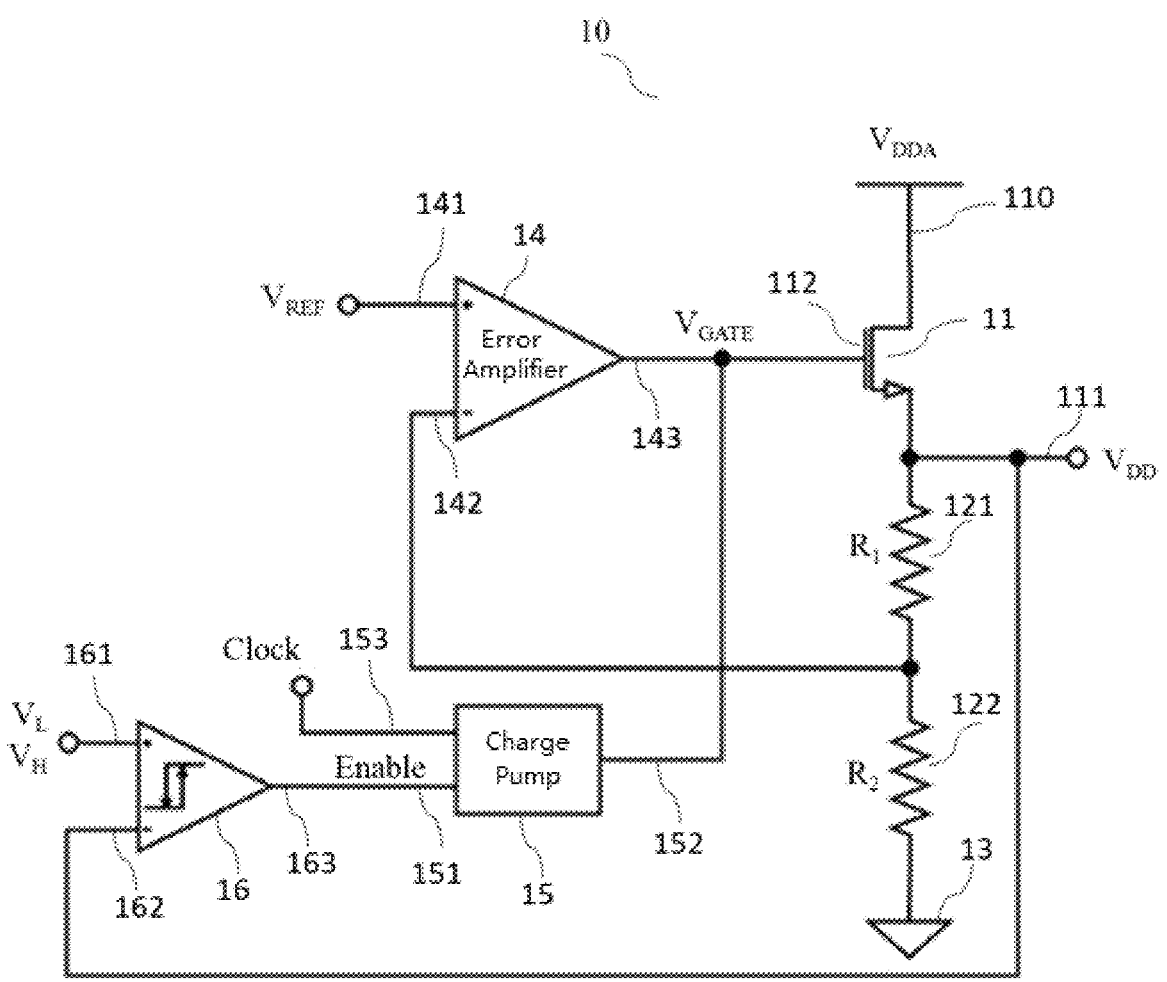
FIG. 3 is a schematic diagram of a circuit structure of a voltage regulator in an embodiment of the present application.

FIG. 3 is a schematic diagram of a circuit structure of a voltage regulator 10 in an embodiment of the present application. The voltage regulator 10 includes a power supply terminal 110 and an output terminal 111, a power supply voltage $V_{DDA}$ may be provided at the power supply terminal 110 of the voltage regulator 10, and the output terminal 111 is configured to connect to a load (or a load circuit) to provide an output voltage $V_{DD}$).

The voltage regulator 10 includes an NMOS transistor 11, a first regulating circuit and a second regulating circuit. The NMOS transistor 11 includes a drain electrode (not shown) connected to the power supply terminal 110 of the voltage regulator 10, a gate electrode 112, and a source electrode (not shown) connected to the output terminal 111 of the voltage regulator 10. The first regulating circuit includes a voltage divider circuit and an error amplifier 14. Here, the voltage divider circuit is connected between the output terminal 111 of the voltage regulator 10 and the ground 13 to generate a feedback voltage based on the output voltage $V_{DD}$ at the output terminal 111 of the voltage regulator 10 and to provide the feedback voltage to the error amplifier 14. In an embodiment of the present application, the voltage divider circuit is a voltage divider resistor network including a resistor 121 and a resistor 122, which are connected in series and coupled between the output terminal 111 of the voltage regulator 10 and the ground 13.

In other embodiments of the present application, the voltage divider circuit may include more or fewer resistors according to actual requirements, and the number and type of resistors are not limited to those disclosed in this disclosure and will not be repeated herein. Herein, $R_1$ denotes a resistance value of the resistor 121, $R_2$ denotes a resistance value of the resistor 122, and the values of $R_1$ and $R_2$ may be selected according to the actual requirements of the circuit, and are not specifically limited herein. The ground 13 may be a common ground terminal (which may be a digital ground or an analog ground) or a voltage reference node in the circuit.

The error amplifier 14 includes a first input terminal 141, a second input terminal 142 and an output 143. Here, a reference voltage $V_{REF}$ is provided at the first input terminal

141 of the error amplifier 14, and the second input terminal 142 thereof is connected to the voltage divider circuit. Specifically, the second input terminal 142 of the error amplifier 14 is coupled to a node between the resistor 121 and the resistor 122 to obtain the feedback voltage. The error amplifier 14 is configured to compare the reference voltage $V_{REF}$ at the first input terminal 141 with the feedback voltage at the second input terminal 142 to output a corresponding drive voltage at the output terminal 143, to control and regulate an output current of the NMOS transistor 11, thereby controlling the output voltage of the NMOS transistor 11. Here, according to equation (1), the output voltage $V_{DD}$ can be changed by regulating the resistance values of the resistors 121 and 122.

In embodiments of the present application, the reference voltage $V_{REF}$ is obtained by transforming the supply voltage $V_{DDA}$ provided at the power supply terminal 110 of the voltage regulator 10. In some embodiments of the present application, the reference voltage $V_{REF}$ may be provided by an independent voltage source.

The second regulating circuit includes a charge pump 15. The charge pump 15 is configured to be selectively turned on based on a change in the output voltage $V_{DD}$, to regulate the output voltage $V_{DD}$ of the voltage regulator 10. The charge pump includes an enable control terminal 151 and an output terminal 152, wherein the enable control terminal 151 is configured to receive an enable control signal, and the output terminal 152 of the charge pump 15 is connected to the gate electrode 112 of the NMOS transistor 11.

Regarding the problem depicted in FIG. 1, in the case of a rapid drop in the output voltage $V_{DD}$ due to a sudden increase in load, the first regulating circuit (i.e., the analog feedback loop) may fail to promptly restore the dropped output voltage $V_{DD}$ due to its slow feedback regulation after response. At this time, in addition to the first regulating circuit, when the output voltage $V_{DD}$ drops rapidly, the second regulating circuit in the voltage regulator 10 may enable the charge pump 15 to regulate the output voltage $V_{DD}$ in response to the drop in the output voltage $V_{DD}$, e.g., to cause the dropped output voltage to be rapidly raised (restored), thereby ensuring the normal operation or operation performance of the load circuit.

In embodiments of the present application, the charge pump 15 further includes a clock input terminal 153. The charge pump is configured to receive a clock signal through the clock input terminal 153 and, upon activation, to increase the voltage $V_{GATE}$ at the gate electrode 112 of the NMOS transistor 11 based on the clock signal, thereby increasing the output voltage $V_{DD}$ of the voltage regulator. In some embodiments of the present application, the second regulating circuit includes a clock circuit, which is an independent clock circuit for providing the clock signal to the charge pump 15.

In some embodiments of the present application, the second regulating circuit further includes a hysteresis comparator 16. The hysteresis comparator 16 is provided with a first input terminal 161, a second input terminal 162 and an output terminal 163. A first threshold voltage $V_L$ and a second threshold voltage $V_H$ are provided for the first input terminal 161, wherein the first threshold voltage $V_L$ is less than the second threshold voltage $V_H$. The second input terminal 162 of the hysteresis comparator 16 is connected to the output terminal 111 of the voltage regulator 10 to obtain the output voltage $V_{DD}$, the output terminal 163 of the hysteresis comparator 16 is connected to the enable control terminal 151 of the charge pump 15. Here, the hysteresis comparator 16 generates an output signal based on the output voltage $V_{DD}$ of the voltage regulator 10, the first threshold voltage $V_L$ and the second threshold voltage $V_G$, and the output signal serves as an enable control signal for the charge pump 15. The values of the first threshold voltage $V_L$ and the second threshold voltage $V_H$ may be selected according to the actual requirements.

In some embodiments, when the voltage regulator 10 operates stably (i.e., there is no change in the load or the output voltage remains stable), the output voltage $V_{DD}$ is a preset voltage or a stable output voltage V'

$$\left( \text{i.e.,} \quad V_{REF} * \left( 1 + \frac{R_1}{R_2} \right) \right),$$

the value of the first threshold voltage $V_L$ may be set to be less than the stable output voltage V'. The value of the second threshold voltage $V_H$ may be set to be greater than, less than, or equal to the stable output voltage V'. In the embodiments of the present application, the difference between the value of $V_H$ and the stable output voltage V' should not be too large, for example, an absolute value of the difference between the second threshold voltage $V_H$ and the stable output voltage V' does not exceed about 5% of the stable output voltage V'.

However, in the embodiment of the present application, when the output voltage $V_{DD}$ of the voltage regulator 10 sudden drops, the hysteresis comparator 16 compares the dropped output voltage $V_{DD}$ with the first threshold voltage VL, and outputs a third level signal through the output terminal 163 to turn on the charge pump 15 in response to that the output voltage $V_{DD}$ is not greater than the first threshold voltage $V_L$, and outputs a fourth level signal to turn off the charge pump 15 in response to that the output voltage $V_{DD}$ is greater than the second threshold voltage (e.g., after the output voltage $V_{DD}$ is quickly recovered by turning on the charge pump 15). After being turned on, the charge pump 15 raises the voltage $V_{GATE}$ at the gate electrode 112 of the NMOS transistor 11, so that the output current of the NMOS transistor 11 increases, thereby raising and recovering the output voltage $V_{DD}$.

It should be noted that the third level signal indicates a high-level signal that can enable the charge pump 15 to be turned on (or operate normally), while the fourth level signal indicates a low-level signal relative to the third level signal and cannot enable the charge pump 15 to be turned on (or operate normally). For example, the third level signal is a level or voltage indicating logic "1", and the fourth level signal is a level or voltage indicating logic "0". In some embodiments of the present application, the charge pump 15 may also be turned on in response to receiving a low-level signal, and turned off in response to receiving a high-level signal, which can be selected according to the actual requirements of the voltage regulator.

Figure 4A:
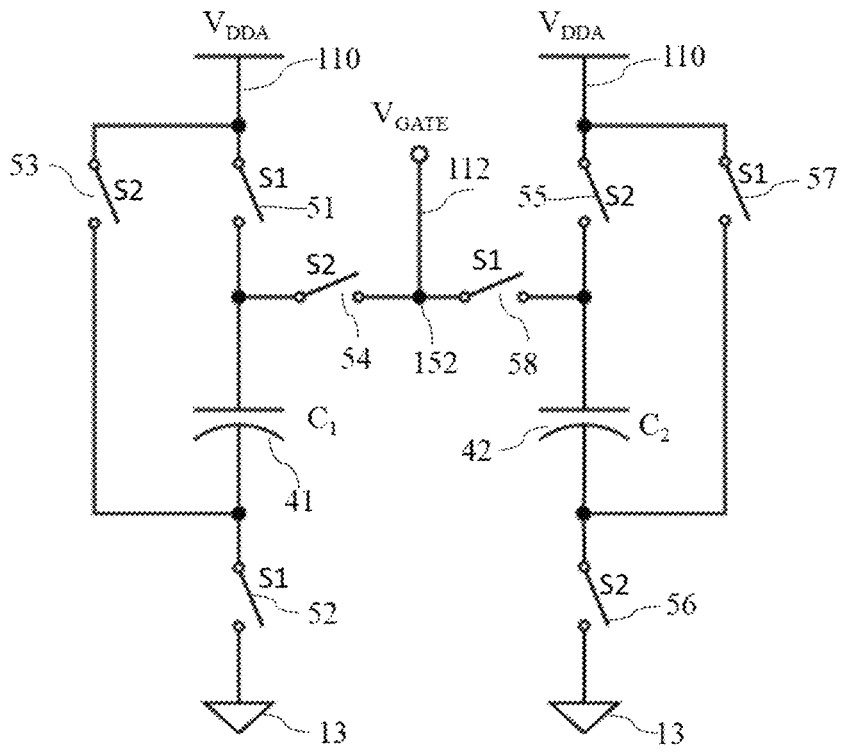
FIGS. 4A and 4B are schematic diagrams of a circuit structure of a charge pump in an embodiment of the present application, respectively.
Figure 4B:
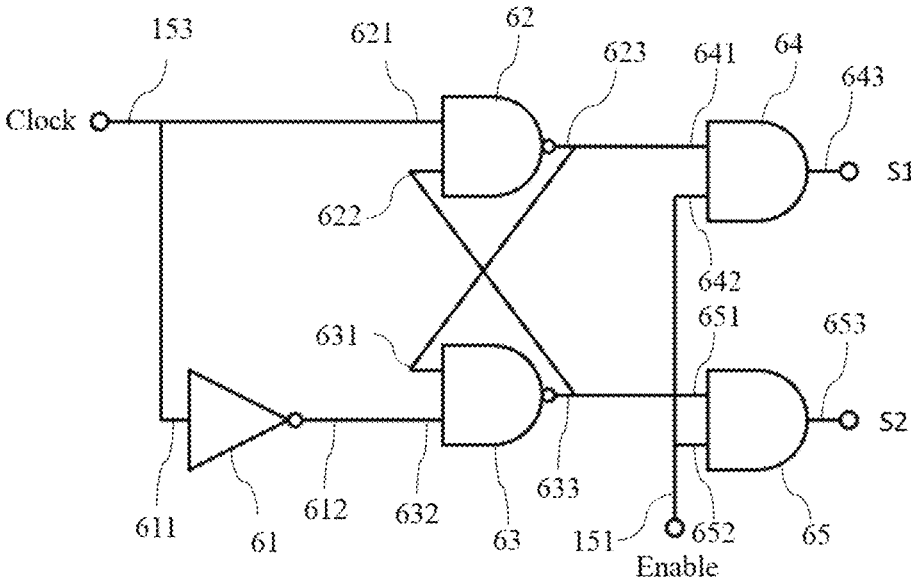

FIGS. 4A and 4B are schematic diagrams of a circuit of the charge pump 15 of an embodiment of the present application, respectively.

As shown in FIG. 4A, the charge pump 15 includes: a first switch group, a second switch group, a first capacitor 41, and a second capacitor 42. The first switch group includes a plurality of switches, and the second switch group includes a plurality of switches. The first capacitor 41 and the first switch group are coupled between the power supply terminal 110 of the voltage regulator 10 and the ground 13, as well as between the output terminal 152 of the charge pump 15 and the ground 13. The second capacitor 42 and the second switch group are coupled between the power supply terminal 110 of the voltage regulator 10 and the ground 13, as well as between the output terminal 152 of the charge pump 15 and the ground 13. When the charge pump 15 is turned on and the clock signal is the first level signal, one or more switches in the first and second switch groups are selectively controlled to charge the first capacitor 41 and discharge the second capacitor 42, respectively; and, when the charge pump 15 is turned on and the clock signal is the second level signal, one or more switches in the first and second switch groups are selectively controlled to discharge the first capacitor 41 and charge the second capacitor 42, respectively. As described above, the charge pump 15 is turned on in response to the enable control signal being the third level signal, and the charge pump 15 is turned off in response to the enable control signal being the fourth level signal.

It should be noted that the first level signal indicates a high-level signal, and the second level signal indicates a low-level signal relative to the first level signal. For example, the high-level signal is a level or voltage indicating logic "1", and the low-level signal is a level or voltage indicating logic "0". In some embodiments of the present application, the first level signal may also be a low-level signal, and the second level signal is a high-level signal accordingly, which may be selected according to the actual requirements of the voltage regulator 10. It should be noted that, in some examples, the high-level signal received at the enable control terminal 151 may be the same with the high-level signal of the clock input terminal 153, and the low-level signal received at the enable control terminal 151 may be the same with the low-level signal received at the clock input terminal 153. In other examples, the high-level signal received at the enable control terminal 151 may be different from the high-level signal of the clock input terminal 153, and the low-level signal received at the enable control terminal 151 may be different from the low-level signal received at the clock input terminal 153.

After the charge pump is turned on, the voltage $V_{GATE}$ at the gate electrode 112 of the NMOS transistor 11 is raised or increased due to the discharging of the first capacitor 41 or the second capacitor 42, thereby rapidly increasing the output voltage $V_{DD}$.

Specifically, the first switch group includes switches 51, 52, 53, and 54. A first end of the switch 51 is connected to the power supply terminal 110 of the voltage regulator 10, and a second end of the switch 51 is connected to a positive pole of the first capacitor 41, a negative pole of the first capacitor 41 is connected to a first end of the switch 52, and a second end of the switch 52 is connected to the ground 13. A first end of the switch 53 is connected to the power supply terminal 110 of the voltage regulator 10, and a second end of the switch 53 is connected to the negative pole of the first capacitor 41, a first end of the switch 54 is connected to the positive pole of the first capacitor 41, and the second end of the switch 54 is connected to the output terminal 152 of the charge pump 15.

The second switch group includes switches 55, 56, 57 and 58. A first end of the switch 55 is connected to the power supply terminal 110 of the voltage regulator 10, and a second end of the switch 56 is connected to a positive pole of the second capacitor 42, a negative pole of the second capacitor 42 is connected to a first end of the switch 56, and a second end of the switch 56 is connected to the ground 13. A first end of the switch 57 is connected to the input terminal 152 of the voltage regulator 10, a second end of the switch 57 is connected to the negative pole of the second capacitor 42, a first end of the switch 58 is connected to the positive pole of the second capacitor 42, and the second end of the switch 58 is connected to the output terminal 152 of the charge pump 15.

When the enable control signal is the third level signal and the clock signal is the first level signal, the switch 51, the switch 52, the switch 57 and the switch 58 (constituting the switch group S1) are switched on, and the switch 53, the switch 54, the switch 55 and the switch 56 (constituting the switch group S2) are switched off. When the enable control signal is the third level signal and the clock signal is the second level signal, the switch 51, the switch 52, the switch 57 and the switch 58 (i.e., the switch group S1) are switched off, and the switch 53, the switch 54, the switch 55 and the switch 56 (i.e., the switch group S2) are switched on. When the enable control signal is the fourth level signal, all switches in the switch groups S1 and S2 are switched off, i.e., the charge pump 15 is turned off or stops operating.

As shown in FIG. 4B, the charge pump 15 further includes a gate control circuit. The gate control circuit includes an enable control terminal 151, a clock input terminal 153, a first output control terminal and a second output control terminal. Here, the first output control terminal is connected to a control terminal (not shown) of the switch 51, the switch 52, the switch 57 and the switch 58, and the second output control terminal is connected to a control terminal (not shown) of the switch 53, the switch 54, the switch 55 and the switch 56. The gate control circuit controls the switch groups S1 and S2 to be selectively switched on or switched off based on the state of the clock signal.

Specifically, the gate control circuit includes: a NOT gate 61, a first NAND gate 62, a second NAND gate 63, a third AND gate 64 and a fourth AND gate 65. Here, the first input terminal 621 of the first NAND gate 62 is connected to the clock input terminal 153 of the charge pump 15, and the second input terminal 622 of the first NAND gate 62 is connected to the output terminal 633 of the second NAND gate 63, the output terminal 623 of the first NAND gate 62 is connected to the first input terminal 631 of the second NAND gate 63 and the first input terminal 641 of the third AND gate 64. The input terminal 611 of the NOT gate 61 is connected to the clock input 153 of the charge pump 15, the output terminal 612 of the NOT gate 61 is connected to the second input terminal 632 of the second NAND gate 63, and the output terminal 633 of the second NAND gate 63 is connected to the first input terminal 651 of the fourth AND gate 65. The second input terminal 642 of the third AND gate 64 and the second input terminal 652 of the fourth AND gate 65 are connected to the enable control terminal 151. The output terminal 643 of the third AND gate 64 is a first output terminal of the gate control circuit, and the output terminal 653 of the fourth AND gate 65 is a second output terminal of the gate control circuit. Here, the output signal at the output terminal 643 is used to communicate with the control terminal of the switches in the switch group S1 for controlling the switching on or off of the switches in the switch group S1, and the output signal at the output 653 terminal is used to communicate with the control terminal of the switches in the switch group S2 for controlling the switching on or off of the switches in the switch group S2.

Figure 5:
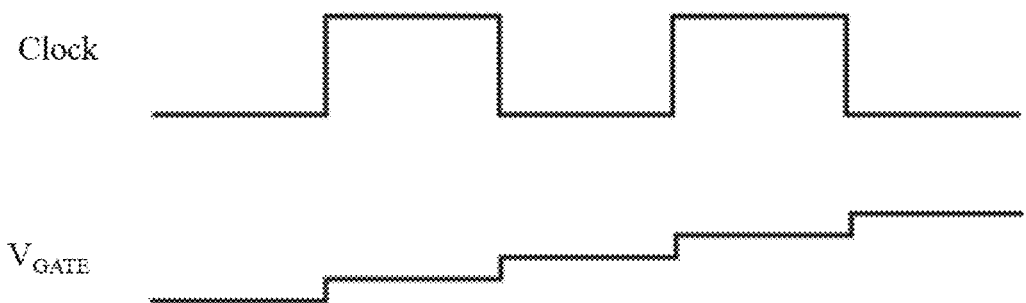
FIG. 5 is a schematic diagram illustrating timing relationship between a clock signal of the charge pump and a gate voltage of an NMOS transistor in an embodiment of the present application.

FIG. 5 is a schematic diagram illustrating timing relationship between a clock signal (Clock) of the charge pump 15 and the gate voltage $V_{GATE}$ of the voltage regulator 10 of the embodiment of the present application.

As shown in FIG. 5, when the enable control signal at the enable input terminal 151 of the charge pump 15 is at a low level (e.g., indicated by a logic "0"), the charge pump 15 is turned off, and all switches in the charge pump 15 (as shown in FIG. 4A) are turned off. When the enable control signal at the enable input terminal 151 of the charge pump 15 is at a high level (e.g., indicated by a logic "1") and the clock signal is at a low level (e.g., indicated by a logic "0"), i.e., during a first duration T1, the switches (i.e., switches 51, 52, 57, and 58) in the switch group S1 (as shown in the FIG. 4A) are on or switched on, switches (i.e., switches 53, 54, 55, and 56) in the switch group S2 are switched off, the first capacitor 41 is charged. It should be noted that, for the first duration T1, since the charge pump 15 is initially turned on and there is no charge in the second capacitor 42, the second capacitor 42 will not be discharged, and at this time, the charge pump 15 would not raise the gate voltage $V_{GATE}$.

When the enable control signal at the enable control terminal 151 of the charge pump 15 is at a high level, and the clock signal is at a high level, for example, during a subsequent first duration T2, the switches (i.e., the switches 51, 52, 57, and 58) in the switch group S1 (as shown in FIG. 4A) are switched off, the switches (i.e., the switches 53, 54, 55, and 56) in the switch group S2 are on or switched on, the first capacitor 41 is discharged and the second capacitor 42 is charged. The discharge of the first capacitor 41 transfers charges toward the gate electrode 112 of the NMOS transistor 11, thereby increasing the gate voltage $V_{GATE}$.

Next, during a subsequent duration T1, i.e., when the enable control signal at the enable control terminal 151 of the charge pump 15 is at a high level and the clock signal is at a low level, the switches (i.e., the switches 51, 52, 57, and 58) in the switch group S1 (as shown in FIG. 4A) are switched on, the switches (i.e., the switches 53, 54, 55, and 56) in the switch group S2 are switched off, the first capacitor 41 is charged, and the second capacitor 42 is discharged. The discharge of the second capacitor 42 transfers charges toward the gate electrode 112 of the NMOS transistor 11, thereby increasing the gate voltage V GATE.

When the enable control signal is at the high level and the clock signal is continuously input, the gate voltage $V_{GATE}$ is raised during each of the durations T1 and T2, forming a stepwise form until the enable control signal is at a low level or the maximum output voltage of the charge pump is reached. Thereby, the charge pump 15 raises and recovers the output voltage $V_{DD}$ of the voltage regulator 10 after the output voltage $V_{DD}$ of the voltage regulator 10 drops.

Figure 6:
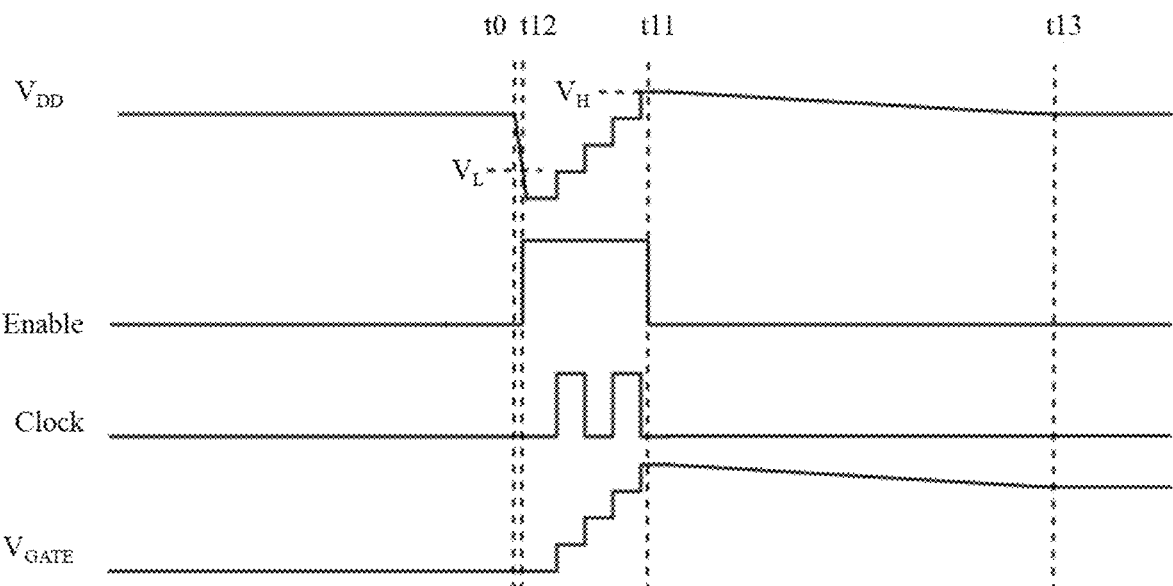
FIG. 6 is a schematic diagram illustrating a relationship of signals of the voltage regulator in FIG. 3.

FIG. 6 is a schematic diagram illustrating timing relationship of various parameters of the voltage regulator 10 of an embodiment of the present application.

As shown in FIG. 6, at time to, the load suddenly increases, causing the output voltage $V_{DD}$ to drop. The hysteresis comparator 16 compares the output voltage $V_{DD}$ with the first threshold voltage $V_L$, and at time t12, when the output voltage $V_{DD}$ is not greater than the first threshold voltage $V_L$, the hysteresis comparator 16 outputs a high-level signal to the enable control terminal 151 of the charge pump 15, to turn on the charge pump 15, and according to the description described above with respect to FIG. 5, the gate voltage $V_{GATE}$ is rapidly raised in a stepwise form, and accordingly, the dropped output voltage $V_{DD}$ is also rapidly raised and restored in a stepwise form.

Subsequently, at time t11, when the output voltage $V_{DD}$ is not less than the second threshold voltage $V_H$, the hysteresis comparator 16 outputs a low-level signal to the enable control terminal 151 of the charge pump 15, enabling the charge pump 15 to be turned off or stop operating, thereby stopping the increase of the gate voltage $V_{GATE}$ and the output voltage $V_{DD}$. It is to be noted that when the second threshold voltage Vu is greater than a preset voltage or a stable output voltage V'

$$\left(i.e.,\ V_{REF}*\left(1+\frac{R_1}{R_2}\right)\right)$$

of the output voltage $V_{DD}$, the gate voltage $V_{GATE}$ and the output voltage $V_{DD}$ slowly decrease under the action of the first regulating circuit, until it recovers to the preset voltage or the stable output voltage $$\left(i.e.,\ V_{REF}*\left(1+\frac{R_1}{R_2}\right)\right)$$

at time t13.

In the embodiments of the present application, the time for the output voltage $V_{DD}$ of the voltage regulator 10 to recover is t11–t0, which is much shorter than the recovery time t1–t0 of the output voltage $V_{DD}$ (as shown in FIG. 2) of the LDO regulator in FIG. 1. In addition, since the charge pump 15 has no static power consumption, compared to the LDO regulator in FIG. 1, the static power consumption of the added hysteresis comparator 16 is much less than the static power consumption of increasing the analog loop bandwidth.

In some embodiments of the present application, the frequency of the clock signal may be 40 MHz. The capacitance C1 of the first capacitor 41 may be ranged from 30 fF to 480 fF and the first capacitor 41 is adjustable. The capacitance C2 of the second capacitor 42 may be ranged from 30 fF to 480 fF, and the second capacitor 42 is adjustable. For example, the voltage recovery time without using the charge pump is greater than 10 μs, while the voltage regulator 10 according to the embodiments of the present invention can significantly reduce the time (i.e., t11–t0) for the output voltage to rapidly recover to be not less than the second threshold voltage Vu after the drop, e.g., not exceeding 100 ns. It is to be noted that, in the case that the absolute value of the difference between the second threshold voltage Vu and the preset voltage or the stable output voltage V' as described above does not exceed about 5% of the preset voltage or the stable output voltage V'

$$\left(i.e.,\ V_{REF}*\left(1+\frac{R_1}{R_2}\right)\right),$$

the output voltage $V_{DD}$ may recover to be greater than the preset voltage or the stable output voltage V', may recover to be less than the preset voltage or the stable output voltage V', or may recover to be equal to the preset voltage or stable output voltage V', with the recovery time not exceeding 100 ns.

In some embodiments of the present application, the NMOS transistor may also be of other transistor types, such as a bipolar transistor (Bipolar), a field-effect transistor (FET), and the like.

Figure 7:
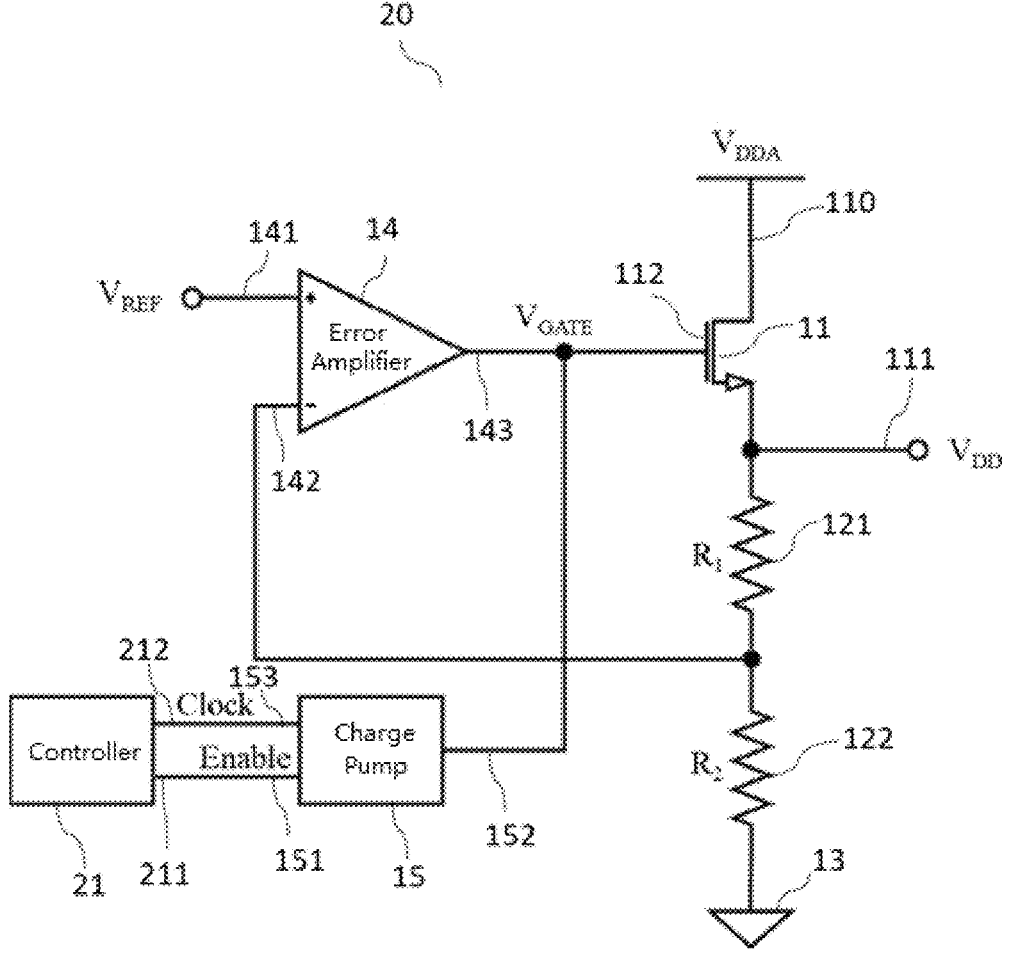
FIG. 7 is a schematic diagram of a structure of another voltage regulator according to an embodiment of this present application.

FIG. 7 is a schematic diagram of a circuit structure of the voltage regulator 20 of another embodiment of the present application.

As shown in FIG. 7, the voltage regulator 20 differs from the voltage regulator 10 described above in that, the second regulating circuit includes a controller 21 instead of the hysteresis comparator 16 in the voltage regulator 10.

Here, the controller 21 is provided with a first output terminal 211 and a second output terminal 212. The first output terminal 211 of the controller 21 is connected to the enable control terminal 151 of the charge pump 15, and the second output terminal 212 of the controller 21 is connected to the clock input terminal 153 of the charge pump 15.

After obtaining information indicating that the output voltage $V_{DD}$ of the voltage regulator 20 will drop at a first time, the controller 21 generates and outputs a third level signal to the enable control terminal 151 at a second time prior to the first time is reached, the charge pump 15 is turned on in response to receiving the third level signal to increase the gate voltage $V_{GATE}$, thereby increasing the output voltage $V_{DD}$ of the voltage regulator 20 before the output voltage $V_{DD}$ drops.

In this way, the output voltage $V_{DD}$) can be pre-compensated. When the output voltage $V_{DD}$ drops rapidly due to a rapid increase in load, the output voltage $V_{DD}$ can remain above the preset voltage or the stable output voltage V', maintaining the normal operation of the load circuit. This is particularly suitable when the load circuit is insensitive to an excessively high output voltage $V_{DD}$ (i.e., the supply voltage of the load circuit) but is sensitive to an excessively low output voltage $V_{DD}$.

In the embodiments of the present application, the information indicating that the output voltage $V_{DD}$ of the voltage regulator 20 will drop at the first time is derived from the information indicating that the load or the load circuit of the voltage regulator 20 will change at the first time. Specifically, the controller 21 stores information or a task indicating that the load or the load circuit will be driven or activated at the first time. Once the task is activated, a time counter or a timer (not shown) in the controller 21 is triggered, and the controller 21 generates and outputs a third level signal to turn on the charge pump 15 at a second time, thereby increasing the output voltage $V_{DD}$ in advance before the first time is reached (i.e., before the output voltage drops).

It should be noted that, except for the controller 21, the other circuit components in the voltage regulator 20 function the same as that in the voltage regulator 10, excluding the hysteresis comparator 16, as described above. Furthermore, although the circuit components and functions are the same, the parameter values of the components may be the same or different according to the actual requirements of the circuit.

Figure 8:
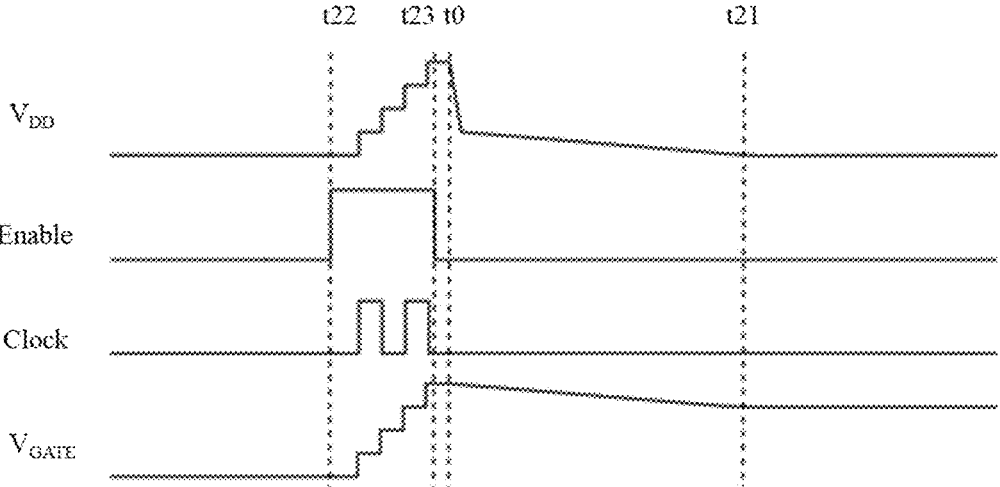
FIG. 8 is a schematic diagram illustrating a relationship of signals of the voltage regulator shown in FIG. 7.

FIG. 8 is a schematic diagram illustrating timing relationship of various parameters of the voltage regulator 20 of an embodiment of the present application.

Referring to FIGS. 7 and 8, the operating principle of the voltage regulator 20 is as follows.

The controller 21 obtains or stores information indicating that the load of the voltage regulator 20 will increase at time to (i.e., the controller 21 knows that the load will increase at time t0), and the controller 21 generates a high-level signal to the enable control terminal 151 of the charge pump 15 through the first output terminal 211 at time t22 prior to time to. Simultaneously, the controller 21 provides a clock signal to the clock input terminal 153 of the charge pump 15 through the second output terminal 212. The charge pump 15 is turned on in response to the enable control terminal 151 being at a high level, and as described above with respect to FIG. 4A, FIG. 4B, and FIG. 5, the charge pump 15 stepwise raises the gate voltage $V_{GATE}$ of the NMOS transistor 11 based on the clock signal, and accordingly, the output voltage $V_{DD}$ is stepwise raised.

Subsequently, at time t23, the controller 21 generates and outputs a low-level signal to the enable control terminal 151 of the charge pump 15 through the first output terminal 211. The charge pump 15 is turned off in response to receiving a low level enable control signal, thereby stopping the raise of the gate voltage $V_{GATE}$.

At time to, the voltage regulator 20 starts to drive the load or the load circuit, and the output voltage $V_{DD}$ drops rapidly. However, since the output voltage $V_{DD}$ has been raised to a higher value before time t0, the output voltage $V_{DD}$ still remains above the preset voltage $$V_{REF} * \left(1 + \frac{R_1}{R_2}\right)$$

after the drop at time t0. Nevertheless, by the first regulating circuit, the output voltage $V_{DD}$) slowly decreases and recovers to the preset voltage $$V_{REF} * \left(1 + \frac{R_1}{R_2}\right)$$

at time t1.

Comparing FIG. 8 with FIG. 2, it can be seen that when the voltage regulator 20 of the embodiments of the present application starts to drive the load or the load circuit, causing the output voltage $V_{DD}$ to drop, the output voltage $V_{DD}$ will not drop below the preset voltage or the stable output voltage V'. For a specific load circuit (i.e. a load circuit that is insensitive to the output voltage $V_{DD}$) being higher than the preset voltage), having an output voltage higher than the preset voltage would not cause the load circuit to fail, thus ensuring that the load circuit still operates normally even after the output voltage $V_{DD}$) drops. In addition, compared to the case of increasing the bandwidth for the LDO regulator in FIG. 1 results in higher static power consumption, both the charge pump 15 and the controller 21 in the voltage regulator 20 have no static power consumption, so the voltage regulator 20 does not increase the static power consumption.

In some embodiments of the present application, the controller 21 may be configured to increase the raising magnitude of the gate voltage $V_{GATE}$ and the output voltage by adjusting one or more of the following parameters: the capacitance of the first capacitor 41 in the charge pump 15, the capacitance of the second capacitor 42 in the charge pump 15, the frequency of the clock signal, and the turn-on time t22. Here, the frequency of the clock signal may be 40 MHz. The capacitance of the first capacitor 41 may be ranged from 30 fF to 480 fF, and the first capacitor 41 is adjustable. The capacitance of the second capacitor 42 may be ranged from 30 fF to 480 fF, and the second capacitor 42 is adjustable.

Embodiments of the present application also provide a power supply device including a power supply and a voltage regulator 10. Embodiments of the present application also provide a system including the power supply device and the load circuit described above.

Embodiments of the present application also provide a power supply device including a power supply and a voltage regulator 20. Embodiments of the present application also provide a system including the power supply device and the load circuit described above.

Finally, it should be noted that the above embodiments are only used to illustrate the technical solutions of the present application and are not intended to limit them. Despite the detailed description of the present application with reference to the foregoing embodiments, the person of ordinary skill in the art should understand that he or she can further modify the technical solutions documented in the foregoing embodiments without additional creative effort or make equivalent substitutions of some technical features. Such modifications or substitutions should not deviate from the essence of the corresponding technical solutions within the spirit and scope of the embodiments of the present application.

What is claimed is:

1. A voltage regulator comprising a power supply terminal and an output terminal, the voltage regulator being configured to provide a power supply voltage at the power supply terminal, and the output terminal being configured to connect to a load and to provide an output voltage, wherein the voltage regulator comprises:

an NMOS transistor comprising a drain electrode connected to the power supply terminal of the voltage regulator, a gate electrode, and a source electrode connected to the output terminal of the voltage regulator;

a first regulating circuit comprising:

a voltage divider circuit connected between the output terminal of the voltage regulator and ground, the voltage divider circuit being configured to generate a feedback voltage based on the output voltage of the output terminal of the voltage regulator;

an error amplifier comprising a first input terminal configured to provide a reference voltage, a second input terminal connected to the voltage divider circuit, and an output terminal connected to the gate electrode of the NMOS transistor; and a second regulating circuit comprising:

a charge pump comprising an enable control terminal configured to receive an enable control signal and an output terminal connected to the gate electrode, the charge pump being configured to be selectively turned on based on the enable control signal to regulate the output voltage of the voltage regulator; and a controller configured to obtain information indicating that the output voltage of the voltage regulator will drop at a first time and to provide a third level signal to the enable control terminal at a second time prior to the first time is reached;

wherein the charge pump is further configured to be turned on in response to receiving the third level signal, to increase the voltage at the gate electrode, thereby increasing the output voltage of the voltage regulator before the output voltage of the voltage regulator drops.

2. The voltage regulator according to claim 1, wherein the charge pump further comprises:

a clock input terminal, wherein the charge pump is configured to receive a clock signal through the clock input terminal and to increase the voltage at the gate electrode of the NMOS transistor based on the clock signal upon being turned on, to increase the output voltage of the voltage regulator.

3. The voltage regulator according to claim 2, wherein the charge pump further comprises:

a first switch group comprising a plurality of switches;

a second switch group comprising a plurality of switches;

a first capacitor, together with the first switch group, being coupled between the power supply terminal of the voltage regulator and the ground, as well as being coupled between the output terminal of the charge pump and the ground;

a second capacitor, together with the second switch group, being coupled between the power supply terminal of the voltage regulator and the ground, as well as being coupled between the output terminal of the charge pump and the ground;

wherein in response to that the charge pump is turned on and the clock signal is a first level signal, one or more switches in the first and second switch groups are selectively controlled to charge the first capacitor and discharge the second capacitor; and in response to that the charge pump is turned on and the clock signal is a second level signal, one or more switches in the first and second switch groups are selectively controlled to discharge the first capacitor and charge the second capacitor; and wherein the charge pump is turned on in response to the enable control signal being the third level signal; and the charge pump is turned off in response to the enable control signal being a fourth level signal.

4. The voltage regulator according to claim 3, wherein the first switch group comprises a first switch, a second switch, a third switch and a fourth switch, wherein a first end of the first switch is connected to the power supply terminal of the voltage regulator, a second end of the first switch is connected to a positive pole of the first capacitor, a negative pole of the first capacitor is connected to a first end of the second switch, a second end of the second switch is connected to the ground, a first end of the third switch is connected to the power supply terminal of the voltage regulator, a second end of the third switch is connected to the negative pole of the first capacitor, a first end of the fourth switch is connected to the positive pole of the first capacitor, and a second end of the fourth switch is connected to the output terminal of the charge pump; and the second switch group comprises a fifth switch, a sixth switch, a seventh switch and a eighth switch, wherein a first end of the fifth switch is connected to the power supply terminal of the voltage regulator, a second end of the fifth switch is connected to a positive pole of the second capacitor, a negative pole of the second capacitor is connected to a first end of the sixth switch, a second end of the sixth switch is connected to the ground, a first end of the seventh switch is connected to the power supply terminal of the voltage regulator, a second end of the seventh switch is connected to the negative pole of the second capacitor, a first end of the eighth switch is connected to the positive pole of the second capacitor, and a second end of the eighth switch is connected to the output terminal of the charge pump;

wherein in response to that the enable control signal is the third level signal and the clock signal is a first level signal, the first switch, the second switch, the seventh switch and the eighth switch are switched on, and the third switch, the fourth switch, the fifth switch and the sixth switch are switched off;

in response to that the enable control signal is the third level signal and the clock signal is a second level signal, the first switch, the second switch, the seventh switch and the eighth switch are switched off, and the third switch, the fourth switch, the fifth switch and the sixth switch are switched on; and in response to that the enable control signal is the fourth level signal, all switches in the first and second switch groups are switched off.

5. The voltage regulator according to claim 4, wherein the charge pump further comprises:

a gate control circuit comprising the enable control terminal, the clock input terminal, a first output control terminal, and a second output control terminal;

wherein the first output control terminal is connected to a control terminal of the first switch, the second switch, the seventh switch and the eighth switch, and the second output control terminal is connected to a control terminal of the third switch, the fourth switch, the fifth switch and the sixth switch.

6. The voltage regulator according to claim 5, wherein the gate control circuit further comprises:

a NOT gate, a first NAND gate, a second NAND gate, a third AND gate and a fourth AND gate;

wherein a first input terminal of the first NAND gate is connected to the clock input terminal, a second input terminal of the first NAND gate is connected to an output terminal of the second NAND gate, an output terminal of the first NAND gate is connected to a first input terminal of the second NAND gate and a first input terminal of the third AND gate;

an input terminal of the NOT gate is connected to the clock input terminal, and an output terminal of the NOT gate is connected to a second input terminal of the second NAND gate, and an output terminal of the second NAND gate is connected to a first input terminal of the fourth AND gate;

a second input terminal of the third AND gate and a second input terminal of the fourth AND gate are connected to the enable control terminal, an output terminal of the third AND gate is a first output terminal of the gate control circuit, and an output terminal of the fourth AND gate is a second output terminal of the gate control circuit.

7. The voltage regulator according to claim 2, wherein the second regulating circuit further comprises a clock circuit configured to output the clock signal.

8. The voltage regulator according to claim 1, wherein the controller is further configured to provide a clock signal to a clock input terminal of the charge pump.

9. The voltage regulator according to claim 8, wherein the information indicating that the output voltage of the voltage regulator will drop at the first time is based on the information indicating that the load of the voltage regulator will change at the first time.

10. The voltage regulator according to claim 9, wherein the controller is configured to start to drive the load at the first time.

11. The voltage regulator according to claim 1, wherein the controller is configured to adjust one or more of the following parameters of the charge pump: capacitance, clock frequency and turn-on time.

* * * * *